United States Patent
Ueda et al.

(10) Patent No.: US 7,670,705 B2
(45) Date of Patent: Mar. 2, 2010

(54) FUEL CELL SYSTEM WITH PURIFYING APPARATUS

(75) Inventors: Hideyuki Ueda, Ibaraki (JP); Takashi Akiyama, Suita (JP); Kohji Yuasa, Hirakata (JP); Shinsuke Fukuda, Moriguchi (JP); Yukihiro Okada, Katano (JP); Satoshi Shibutani, Hirakata (JP)

(73) Assignee: Panasonic Corporation, Osaka (JP)

( * ) Notice: Subject to any disclaimer, the term of this patent is extended or adjusted under 35 U.S.C. 154(b) by 769 days.

(21) Appl. No.: 10/567,437

(22) PCT Filed: Mar. 2, 2005

(86) PCT No.: PCT/JP2005/003455

§ 371 (c)(1),
(2), (4) Date: Feb. 7, 2006

(87) PCT Pub. No.: WO2005/088752

PCT Pub. Date: Sep. 22, 2005

(65) Prior Publication Data

US 2008/0213647 A1  Sep. 4, 2008

(30) Foreign Application Priority Data

Mar. 12, 2004  (JP) ............................. 2004-070444

(51) Int. Cl.
*H01M 2/00* (2006.01)
(52) U.S. Cl. .......................................... 429/34; 429/30
(58) Field of Classification Search ...................... None
See application file for complete search history.

(56) References Cited

U.S. PATENT DOCUMENTS

| | | | | |
|---|---|---|---|---|
| 5,106,588 A * | 4/1992 | Sims et al. | .................. | 422/180 |
| 5,330,956 A * | 7/1994 | Haga et al. | .................. | 502/261 |
| 6,124,054 A * | 9/2000 | Gorman et al. | ............... | 429/34 |
| 6,509,112 B1 * | 1/2003 | Luft et al. | ..................... | 429/13 |
| 6,623,880 B1 | 9/2003 | Geisbrecht et al. | | |

(Continued)

FOREIGN PATENT DOCUMENTS

JP  49-34092 B1  9/1974

(Continued)

OTHER PUBLICATIONS

European Search Report issued in European Patent Application No. 05719770.9-1227/1667269 dated on Aug. 21, 2008.

*Primary Examiner*—Dah-Wei D Yuan
*Assistant Examiner*—Kwang Han
(74) *Attorney, Agent, or Firm*—McDermott Will & Emery LLP

(57) ABSTRACT

A fuel cell system includes: a fuel cell including an anode, a cathode, and an electrolyte interposed between the anode and the cathode; and a purifying apparatus including a catalyst layer that purifies an effluent discharged from the anode. The purifying apparatus has a porous sheet including the catalyst layer and two flow paths disposed on both sides thereof. One of the flow paths has an inlet into which the effluent discharged from the anode is introduced, and the other flow path has an inlet into which air is introduced and an outlet. The effluent discharged from the anode is passed through the porous sheet for purification and then discharged from the outlet.

9 Claims, 2 Drawing Sheets

U.S. PATENT DOCUMENTS

| | | | |
|---|---|---|---|
| 6,632,553 B2 * | 10/2003 | Corey et al. | 429/22 |
| 6,641,862 B1 * | 11/2003 | Grot | 427/115 |
| 2003/0077488 A1 | 4/2003 | Yamamoto et al. | |
| 2003/0138677 A1 | 7/2003 | Preidel | |
| 2005/0084729 A1 * | 4/2005 | Dohle et al. | 429/34 |

FOREIGN PATENT DOCUMENTS

| | | |
|---|---|---|
| JP | 9-92311 | 4/1997 |
| JP | 09-206596 | 8/1997 |
| JP | 2001-017835 | 1/2001 |
| JP | 2001-313059 | 11/2001 |
| JP | 2003-223920 | 8/2003 |
| JP | 2005-25959 | 1/2005 |
| JP | 2005-505738 | 2/2005 |
| WO | WO 03/031874 A1 | 4/2003 |
| WO | WO 03/047010 * | 6/2003 |

* cited by examiner

FUEL CELL SYSTEM WITH PURIFYING APPARATUS

This application is the U.S. National Phase under 35 U.S.C. §371 of International Application No. PCT/JP05/003455, filed Mar. 2, 2005, which in turn claims the benefit of Japanese Application No. 2004-070444, filed Mar. 12, 2004, the disclosures of which Applications are incorporated by reference herein in their entirety.

TECHNICAL FIELD

The present invention relates to a fuel cell system including a fuel cell and a purifying apparatus for purifying an effluent discharged from the fuel cell.

BACKGROUND ART

Portable small-sized electronic appliances, such as cellular phones, personal digital assistants (PDA), notebook PCs, and video cameras, have been becoming more and more multi-functional, and the electric power consumed by such appliances and the continuous operating time tend to increase commensurately. To cope with such tendency, there is a strong demand to heighten the energy density of power sources for such appliances. Currently, lithium secondary batteries are mainly used as such power sources, but the energy density of lithium secondary batteries is estimated to reach their limit at about 500 Wh/L or 200 Wh/kg around the year of 2005. It is therefore desired that polymer electrolyte fuel cells (PEFC) be commercialized as early as possible as an alternative power source to lithium secondary batteries. Among PEFCs, direct-type fuel cells, which generate electricity by directly supplying an organic fuel to the anode without reforming it into hydrogen, are considered to be particularly promising. As the organic fuel, for example, methanol, ethanol, dimethyl ether, etc., are used. Direct-type fuel cells have been receiving attention in terms of the high theoretical energy density of the organic fuel, system simplification, the ease of fuel storage, etc., and hence their research and development is actively underway.

A direct-type fuel cell includes an anode, a cathode, and a polymer electrolyte membrane sandwiched therebetween. Each of the anode and the cathode has a catalyst layer in contact with the polymer electrolyte membrane, and a gas diffusion layer disposed on the outer side of the catalyst layer. A mixture of an organic fuel and water is directly supplied to the anode while an oxidant, for example, oxygen or air, is supplied to the cathode. An electrochemical reaction between the fuel and the oxidant produces electricity.

The electrode reactions of a direct-type fuel cell (DMFC) using, for example, methanol as the organic fuel are as follows.

Anode electrode: $CH_3OH+H_2O \rightarrow CO_2+6H^++6e^-$

Cathode electrode: 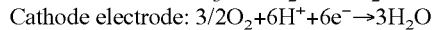$3/2O_2+6H^++6e^- \rightarrow 3H_2O$

That is, on the anode, methanol reacts with water to produce carbon dioxide, protons, and electrons. The protons pass through the electrolyte membrane and reach the cathode. On the cathode, oxygen and the protons combine together with the electrons that have passed through an external circuit to produce water. Thus, if the completely ideal reaction takes place on the anode, the chemical substance discharged from the anode is only carbon dioxide (carbonic acid gas). However, since an aqueous methanol solution with a concentration of 3 to 30 wt % is usually supplied to the anode, unreacted methanol and significantly excessive water are discharged from the anode. Further, the effluent discharged from the anode may contain side-reaction products (formaldehyde, formic acid, etc.) or chemical substances that are in an intermediate stage of reaction.

Methanol, formaldehyde, and formic acid are designated as deleterious substances under Poisonous and Deleterious Substances Control Law. Also, since formaldehyde can be a cause of sick building syndrome, the amount of release thereof is strictly limited. According to the Recommendation of Occupational Exposure Limits (2002) of Japan Society for Occupational Health, the allowable concentration of each substance is 200 ppm for methanol, 0.5 ppm for formaldehyde, and 5 ppm for formic acid. The allowable concentration refers to the concentration that is regarded as having no adverse health effect on almost all workers who are exposed to a harmful substance for 8 hours per day, about 40 hours per week. Further, with respect to formaldehyde, the Ministry of Health, Labor and Welfare has drawn up a guideline value of indoor concentration of 0.08 ppm.

When an electronic appliance equipped with a direct-type fuel cell is used indoors for an extended period of time, it is essential to control the concentration of unreacted fuel or by-products in the effluent discharged from the fuel cell at a low level such that it does not exceed the above-mentioned allowable concentration. It appears that solving this problem is a key to commercialization of direct-type fuel cells.

In DMFCs, one method proposed for separating methanol and carbon dioxide that are discharged from the anode is cooling a mixed gas of vaporized methanol and carbon dioxide to condense most of the methanol. Another proposed method is to separate them by using a separation membrane and vent only the carbon dioxide to the outside.

However, in the case of the former method, in actuality it is extremely difficult to mount a mechanism that cools the exhaust gas until the vapor pressure of methanol becomes sufficiently low in electronic appliances equipped with a DMFC. Also, the latter method cannot become an effective method unless a separation membrane with a sufficiently high separation factor of methanol and carbon dioxide and a high permeation speed of carbon dioxide is available. At present, a separation membrane with an excellent function is not available.

Meanwhile, purifying methods and apparatus for combusting methanol, formaldehyde, etc., in exhaust gas by using an oxidation catalyst have been proposed. For example, Patent Document 1, which does not relate to a direct-type fuel cell system, discloses a fuel cell system including a vaporizer for vaporizing methanol and water and a heater for heating the vaporizer through combustion reaction of methanol. It proposes using a trap catalyst for trapping uncombusted methanol and aldehyde discharged from the heater. In order to oxidize the uncombusted methanol and aldehyde, the trap catalyst is supplied with hydrogen or air discharged from the fuel cell.

Patent Document 2 discloses a direct-type fuel cell system using a liquid fuel and proposes the use of a gas-liquid separation bath for separating products of electrochemical reaction into gas and liquid and a filter for absorbing or decomposing by-products contained in the separated gas. Also, a honeycomb layer carrying a noble metal catalyst or the like is used as the filter.

Patent Document 3, which does not relate to a direct-type fuel cell system, proposes a method of deodorizing exhaust gas by oxidizing the small amount of aldehyde contained in combusted exhaust gas by using an oxidation catalyst including manganese dioxide and copper (II) oxide as main components. Also, there has been proposed a catalyst unit for deodorizing combusted exhaust gas in which oxidation catalysts are filled in layers.

Patent Document 1: Japanese Laid-Open Patent Publication No. 2001-17835

Patent Document 2: Japanese Laid-Open Patent Publication No. 2003-223920

Patent Document 3: Japanese Laid-Open Patent Publication No. Hei 9-206596

DISCLOSURE OF INVENTION

Problem that the Invention is to Solve

The trap catalyst proposed by Patent Document 1 is carried on partitions of a honeycomb carrier through which exhaust gas flows. Thus, most of the exhaust gas undesirably passes through the through-holes of the honeycomb carrier, so that methanol and formaldehyde are not completely trapped by the trap catalyst. It is therefore difficult to reduce the concentration of predetermined substances in the exhaust gas to legally allowable concentration or lower.

In the case of the fuel cell system proposed by Patent Document 2, an effective method for separating gas from liquid has not been found as described above, and it is thus difficult to perform a complete separation by using the gas-liquid separation bath. Also, even if a honeycomb layer carrying a catalyst is used as the filter, it is difficult to completely trap unreacted fuel or by-products.

Further, in Patent Document 2, when the gas is passed though the filter, there is a large pressure loss. It is therefore necessary to use, for example, a pump providing a high pressure, thereby inviting an increase in the size of the entire system and an increase in electric power loss. Similarly, Patent Document 3 also suffers from the problem of very large pressure loss, since the air for catalytic combustion is required to pass through the filter together with the exhaust gas.

In view of the above, an object of the present invention is to provide a fuel cell system capable of purifying effluent discharged from anode of a fuel cell with high efficiency and capable of making the pressure loss small in supplying air for catalytic combustion necessary for purification.

Means for Solving the Problem

The present invention relates to a fuel cell system including: a fuel cell comprising an anode, a cathode, and an electrolyte interposed between the anode and the cathode; and a purifying apparatus comprising a catalyst layer that purifies an effluent discharged from the anode. The purifying apparatus has a porous sheet including the catalyst layer and has two flow paths disposed on both sides of the porous sheet. One of the flow paths has an inlet into which the effluent discharged from the anode is introduced, and the other flow path has an inlet into which air is introduced and an outlet. The effluent discharged from the anode is passed through the porous sheet for purification and then discharged from the outlet.

The effluent discharged from the anode is always passed through the porous sheet including the catalyst layer before being discharged. Thus, most of unreacted fuel or by-products have a chance to come into contact with the catalyst. Hence, unreacted fuel or by-products are catalytically combusted with high efficiency, thereby being converted into water and carbon dioxide. Also, the effluent discharged from the anode is introduced into the purifying apparatus having the catalyst layer without being mixed with air in advance, and it reaches the porous sheet separately from air. The fuel diffusing from one side of the porous sheet and the oxygen in the air diffusing from the other side come into contact with the active sites inside the catalyst layer, and combustion takes place. Therefore, the effluent discharged from the anode is prevented from being swept away by a large amount of air without coming into contact with the active sites of the catalyst layer, and the residence time of the remaining fuel, during which it comes into contact with the active sites and reacts with oxygen, becomes longer. Further, since there is no need to pass the air for catalytic combustion through the porous sheet, the pressure loss in supplying the air for catalytic combustion can be made small.

The present invention is particularly effective when the fuel cell is a direct-type fuel cell in which an organic fuel is directly supplied to the anode and air is supplied to the cathode. It is preferred that the organic fuel be directly supplied in liquid form to the anode. It is particularly preferred that the organic fuel be diluted with a solvent such that the resultant solution is supplied thereto. Water is preferably used as the solvent.

The present invention can realize a non-circulation type fuel cell system in which the effluent discharged from the anode is collected and purified without being supplied to the anode again. In the non-circulation type fuel cell system, it is preferred that the amount of unreacted fuel discharged from the anode be reduced to a minimum by making the amount of fuel supplied to the anode as close to the amount of fuel consumed during the production of electricity as possible. Since the non-circulation type fuel cell system requires no apparatus for circulating fuel, for example, cooler for cooling the effluent discharged from the anode or gas-liquid separating apparatus, a compact system design is possible.

It is preferred that the porous sheet have a layered structure in which porous diffusion layers are disposed on both sides of the catalyst layer. Due to the provision of the porous diffusion layers, the effluent discharged from the anode and introduced into one of the flow paths and the air introduced into the other flow path can be evenly supplied into the catalyst layer. Also, the air containing carbon dioxide and water produced by catalytic combustion is promptly discharged from the outlet. Therefore, high level improvement of the efficiency of catalytic combustion and high level reduction of the pressure loss can be compatible with each other.

The air discharged from the cathode of the fuel cell may also contain small amounts of carbon monoxide or other by-products in some cases. Thus, the air to be introduced into the purifying apparatus preferably includes the air discharged from the cathode of the fuel cell. In this case, the carbon monoxide or by-products contained in the air discharged from the cathode can be purified by catalytic combustion simultaneously with the unreacted fuel or by-products discharged from the anode.

It is preferred that the temperature inside the purifying apparatus be set to 30 to 80° C. in terms of enhancing the catalytic activity of the catalyst layer and improving the combustion efficiency of the unreacted fuel or by-products. Although the catalytic activity increases as the temperature inside the purifying apparatus becomes higher, the range of 30 to 80° C. is proper in consideration of the adverse effect on portable appliances or systems.

It is preferred that the catalyst in the catalyst layer be composed simply of platinum or comprise an alloy or mixture comprising platinum and other metal. It is also preferred that above other metal be at least one selected from the group consisting of ruthenium, iron, cobalt, nickel, chromium, molybdenum, rhodium, palladium, osmium, and iridium.

Platinum is stable in an oxidizing atmosphere including oxygen and exhibits high catalytic activity with respect to the oxidation reaction of methanol. Hence, the use of platinum makes it possible to improve the efficiency of catalytic combustion even in a low temperature environment.

Preferably, the organic fuel includes at least methanol. Methanol has advantages of high theoretical energy density, easy storage, and low costs. It is preferred that methanol be directly supplied to the anode in the form of an aqueous methanol solution.

Effects of the Invention

According to the present invention, in a fuel cell system, the effluent discharged from the anode of a fuel cell can be purified with high efficiency and the pressure loss can be made small in supplying air for catalytic combustion necessary for purification. According to the present invention, it is possible to realize a non-circulation type fuel cell system capable of purifying the effluent discharged from the anode without recirculating it through the anode, and a compact system design is possible.

BEST MODE FOR CARRYING OUT THE INVENTION

First Embodiment

Figure 1:
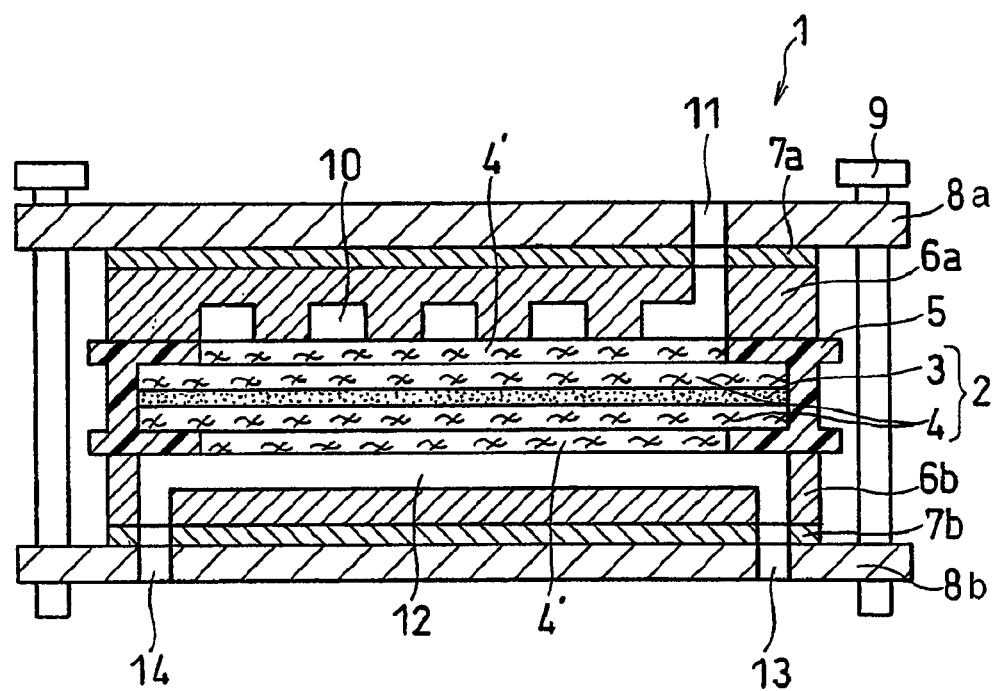
[FIG. 1] An enlarged cross-sectional view of an exemplary purifying apparatus in accordance with the present invention.

FIG. 1 is an enlarged cross-sectional view of an exemplary purifying apparatus in accordance with the present invention. A purifying apparatus 1 has a porous sheet 2 in the central part thereof, where unreacted fuel or by-products are catalytically combusted. The porous sheet 2 comprises a catalyst layer 3 and a pair of porous diffusion layers 4 sandwiching it. On both sides of the porous sheet are a flow path 10 into which the effluent discharged from the anode is introduced and a flow path 12 into which air is introduced. The flow path 10 has only an inlet 11 into which the effluent discharged from the anode is introduced and does not have an outlet. The flow path 12 has an inlet 13 into which air is introduced and an outlet 14.

A gas sealing member 5 is fitted to the periphery of the porous sheet 2. Porous diffusion layers 4', which have almost the same thickness as that of the gas sealing member, are disposed on both sides of the porous sheet 2, and they prevent liquid or air from leaking out of the respective flow paths. The porous diffusion layers 4' may be regarded as part of the porous sheet 2. The porous sheet 2 fitted with the gas sealing member 5 is sandwiched between resin-impregnated graphite plates 6a and 6b, each of which has a flat face with a groove. The groove formed on the resin-impregnated graphite plate 6a serves as the flow path 10 into which the effluent discharged from the anode is introduced, while the groove formed on the resin-impregnated graphite plate 6b serves as the flow path 12 into which air is introduced. Outside the resin-impregnated graphite plates 6a and 6b are disposed heaters 7a and 7b, respectively, which control the temperature of the purifying apparatus. Outside the heaters 7a and 7b are disposed end plates 8a and 8b, which are fixed securely with clamping bolts 9. The flow paths may have any desired shape. Also, the flow paths may be formed on a material other than the resin-impregnated graphite plate.

Figure 2:
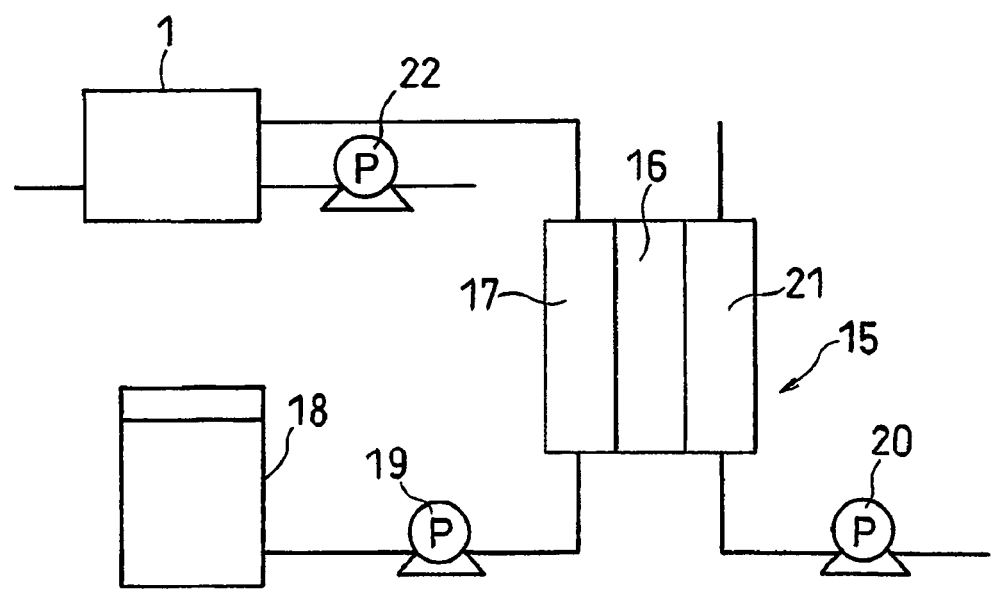
[FIG. 2] A schematic view showing an exemplary fuel cell system in accordance with the present invention.

FIG. 2 is a schematic view showing an exemplary fuel cell system of the present invention. A fuel cell 15 comprises an anode 17 and a cathode 21 sandwiching an electrolyte 16, and a fuel and an oxidant are supplied to the anode 17 and the cathode 21, respectively. The fuel cell 15 is usually equipped with a heater (not shown) for controlling the temperature thereof. A fuel flow channel (not shown) is provided adjacent to the anode 17, and the fuel is directly fed from a fuel tank 18 to the fuel flow channel via a pump 19. Also, an oxidant flow channel (not shown) is provided adjacent to the cathode 21, and air is fed to the oxidant flow channel from the outside atmosphere via a pump 20.

The outlet of the fuel flow channel communicates with the inlet 11 of the purifying apparatus 1. The fuel that has not been consumed during the generation of electricity by the fuel cell 15 is introduced into the flow path 10. For example, in the case of a system including a direct-type fuel cell in which an aqueous solution of an organic fuel is supplied to the anode, an aqueous solution containing unreacted fuel or its vapor is introduced into the flow path 10 from the inlet 11. The aqueous solution or its vapor introduced into the flow path 10 permeates the porous diffusion layer 4 and reaches the catalyst layer 3.

On the other hand, air is supplied to the flow path 12 from the inlet 13 of the purifying apparatus 1 via an air pump 22. The oxygen in the air diffuses through the porous diffusion layer 4 and reaches the catalyst layer 3. Although air may be supplied from the outside atmosphere, the air discharged from the cathode may be used by connecting the outlet of the oxidant flow channel of the fuel cell 15 to the inlet 13 of the purifying apparatus 1. This makes it possible to construct a more environmentally friendly system.

While the aqueous solution or its vapor is passing through the catalyst layer 3, the unreacted fuel reacts with the oxygen that has reached the catalyst layer 3, thereby being converted into water and carbon dioxide. At this time, by setting the temperature of the porous sheet inside purifying apparatus to 30 to 80° C. by means of the heaters 7a and 7b, the catalytic activity of the catalyst layer 3 is heightened, so that the unreacted fuel combusts with high efficiency. Thereafter, the water and carbon dioxide are discharged from the outlet 14 together with the air introduced from the inlet 13.

It is preferred that the catalyst layer may comprise, for example, a thin film containing conductive carbon particles carrying a catalyst metal, though any substance that promotes the combustion of unreacted fuel or by-products may be used without any particular limitation. The thickness of the catalyst layer is sufficient if it is, for example, approximately 10 to 50 μm, but there is no particular limitation. Exemplary catalyst metals include platinum, ruthenium, iron, cobalt, nickel, chromium, molybdenum, rhodium, palladium, osmium, iridium, etc. They may be used singly or in combination of two or more of them.

While the porous diffusion layer may be formed of various porous materials, it is preferred to use a material allowing good diffusion of unreacted fuel, air, carbon dioxide, and the like. For example, carbon paper, carbon cloth, or the like is preferable as the porous diffusion layer. The thickness of the porous diffusion layer is, for example, approximately 100 to 500 μm, but there is no particular limitation.

The present invention is suited for systems including a direct-type fuel cell that uses an organic fuel. There is no particular limitation with respect to the organic fuel, but methanol, dimethyl ether, ethylene glycol, etc., may be used. These organic fuels are desirably used in the form of an aqueous solution.

Second Embodiment

Figure 3:
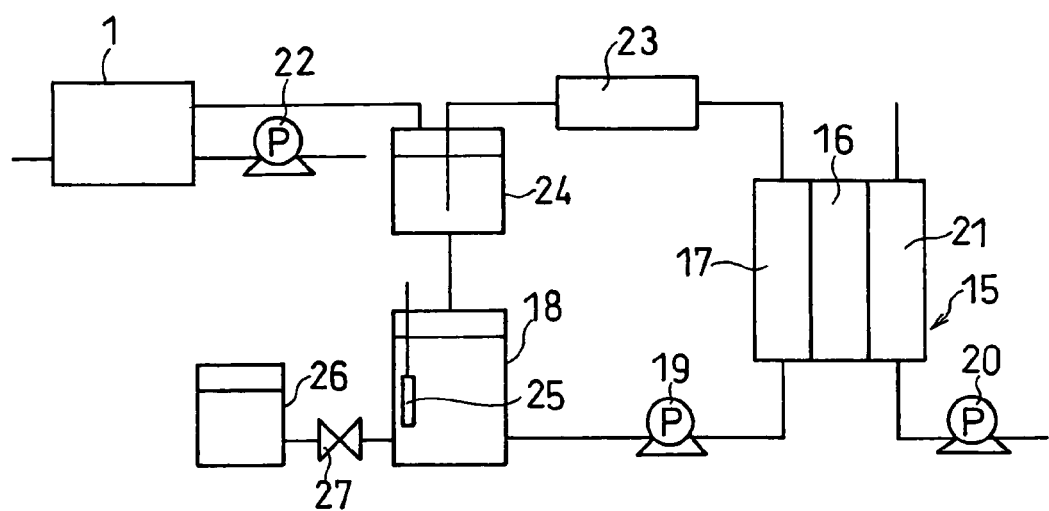
[FIG. 3] A schematic view showing another exemplary fuel cell system in accordance with the present invention.

FIG. 3 is a schematic view showing another exemplary fuel cell system in accordance with the present invention. The same constituent elements as those of the first embodiment are given the same reference symbols as those of FIG. 2. In the first embodiment, the non-circulation type system has been described in which the effluent discharged from the anode is collected, purified without being supplied to the anode again, and discharged to the outside. Herein, a circulation type system is described below.

The fuel cell system of FIG. 3 is equipped with a cooler 23, which collects the effluent discharged from the anode of the fuel cell 15 and cools it, and a gas-liquid separating apparatus 24, which separates the cooled effluent into gas components and liquid components. The effluent discharged from the anode is cooled by the cooler 23, and then separated as much as possible into gas components and liquid components by the gas-liquid separating apparatus 24. The gas components separated by the gas-liquid separating apparatus 24 are introduced into the flow path 10 from the inlet 11 of the purifying apparatus 1 and purified while they are passing through the porous sheet 2. That is, they are oxidized by oxygen in the air supplied through the pump 22, thereby being converted to water and carbon dioxide, after which they are vented to the outside atmosphere. On the other hand, the liquid components are collected into a fuel tank 18.

The fuel tank 18 contains, for example, an aqueous solution of an organic fuel. The fuel concentration in the aqueous solution is continuously monitored with a concentration sensor 25. When the fuel concentration in the fuel tank 18 lowers to below a certain level, the organic fuel is supplied, as appropriate, from a raw material tank 26 containing the organic fuel through a valve 27. Such adjustments of fuel concentration are preferably made by using an automatic control system.

In the circulation-type system, most of unreacted fuel is collected from the effluent discharged from the anode of the fuel cell, and then only the gas components are purified by the purifying apparatus. Therefore, even if the temperature inside the purifying apparatus is set to relatively low temperatures, for example, 60° C. or less, 50° C. or less, 40° C. or less, or 30° C. or less, sufficient purification is possible.

A fuel cell system according to the present invention is hereinafter described more specifically by way of Examples and Comparative Examples. The following Examples, however, are not to be construed as limiting in any way the present invention.

EXAMPLE 1

A non-circulation type fuel cell system according to the first embodiment of the present invention was constructed. First, a purifying apparatus for purifying the effluent discharged from the anode of the fuel cell was fabricated in the following manner.

Catalyst-carrying particles were prepared by placing 25 parts by weight of platinum and 25 parts by weight of ruthenium each having a mean particle size of 30 Å, which served as catalyst metals, on 50 parts by weight of conductive carbon particles (ketjen black EC available form AKZO Chemie, the Netherlands) with a mean primary particle diameter of 30 nm. A dispersion of the catalyst-carrying particles in an aqueous isopropanol solution was mixed with a dispersion of a polymer electrolyte in an aqueous ethyl alcohol solution. The resultant liquid mixture was stirred with a bead mill, to form a catalyst paste in a highly dispersed state. The weight ratio between the catalyst-carrying particles and the polymer electrolyte in the catalyst paste was made 1:1. The polymer electrolyte used was a perfluorocarbon sulfonic acid ionomer (Flemion available from Asahi Glass Co., Ltd.).

The catalyst paste was applied by spraying onto a 180-μm-thick carbon paper (TGP-H060 available from Toray Industries Inc.) serving as a porous diffusion layer, and the applied paste was dried for 12 hours in air at room temperature, to form a 30-μm-thick catalyst layer with outer dimensions of 60 mm×60 mm. The amounts of platinum and ruthenium contained in the catalyst layer were 2 mg/cm$^2$, respectively (72 mg each). Further, the catalyst layer was sandwiched between the carbon paper and another carbon paper serving as another porous diffusion layer, and the whole laminate was pressed. This produced a porous sheet composed of the catalyst layer sandwiched between the porous diffusion layers.

A gas sealing member was fitted to the periphery of the porous sheet, and further, as illustrated in FIG. 1, carbon papers same as the above were laminated on the upper and lower faces of the porous sheet, and the whole laminate was sandwiched between a pair of 5-mm-thick resin-impregnated graphite plates. The resin-impregnated graphite plates had a serpentine flow path of 2 mm in width and 2 mm in depth on their faces opposing the porous sheet. The flow path of one of the resin-impregnated graphite plates was provided with an inlet only, and the flow path of the other resin-impregnated graphite plate was provided with an inlet and an outlet. These two flow paths were of the same shape. A sheet-like heater for temperature control was mounted on the outer side of each resin-impregnated graphite plate, and an end plate was further mounted on the outer side thereof. The end plates were fixed securely with clamping bolts, to complete a purifying apparatus. The temperature inside the purifying apparatus was maintained at 60° C. by means of the heaters.

Using this purifying apparatus, a fuel cell system A as illustrated in FIG. 2 was constructed. A stack of 10 unit cells each comprising an anode, a cathode and a polymer electrolyte membrane was used as the fuel cell. An aqueous methanol solution was supplied to the anode of the fuel cell from the fuel tank via the fuel pump. Also, air was supplied to the cathode from the outside atmosphere via the air pump. The aqueous solution discharged from the anode of the fuel cell or its vapor was introduced into the flow path of the purifying apparatus having only the inlet, and air was supplied to the flow path of the other resin-impregnated graphite plate from the outside atmosphere via the pump.

EXAMPLE 2

In producing a purifying apparatus, after the catalyst layer was formed on the porous diffusion layer, no further porous diffusion layer was laminated on the catalyst layer, and the flow path having only the inlet was arranged so as to directly face the catalyst layer. Except for this, in the same manner as in Example 1, a purifying apparatus was fabricated. Next, a fuel cell system (system B) was constructed in the same manner as in Example 1 except for the use of this purifying apparatus. The aqueous solution discharged from the anode of the fuel cell or its vapor was introduced into the flow path having only the inlet, and air was supplied to the flow path having the inlet and the outlet.

EXAMPLE 3

A purifying apparatus was fabricated in the same manner as in Example 2, except that the arrangement of the porous sheet was reversed. That is, herein, the flow path having the inlet and the outlet was arranged so as to directly face the catalyst layer. Subsequently, a fuel cell system (system C) was constructed in the same manner as in Example 2 except for the use of this purifying apparatus. The aqueous solution discharged from the anode of the fuel cell or its vapor was introduced into the flow path having only the inlet, and air was supplied to the flow path having the inlet and the outlet.

EXAMPLE 4

A fuel cell system (system D) was constructed in the same manner as in Example 1, except that the temperature inside the purifying apparatus was maintained at 40° C. by means of the heaters.

EXAMPLE 5

A fuel cell system (system E) was constructed in the same manner as in Example 1, except that the temperature inside the purifying apparatus was maintained at 30° C. by means of the heaters.

EXAMPLE 6

A fuel cell system (system E) was constructed in the same manner as in Example 1, except that the atmospheric temperature was set to below 20° C. and that the temperature inside the purifying apparatus was maintained at 20° C. by means of the heaters.

EXAMPLE 7

A fuel cell system (system G) was constructed in the same manner as in Example 1, except that air discharged from the cathode of the fuel cell was introduced into the flow path of the purifying apparatus having the inlet and the outlet via the pump.

COMPARATIVE EXAMPLE 1

A fuel cell system (system 1) was constructed in the same manner as in Example 1, except that the aqueous solution discharged from the anode of the fuel cell or its vapor was mixed with air in advance and the resultant mixture was introduced into the flow path of the purifying apparatus having only the inlet, and that no air was supplied to the flow path having the inlet and the outlet from the outside atmosphere.

COMPARATIVE EXAMPLE 2

A 10-mm-thick ceramic honeycomb structure (its through-holes had a hexagonal cross-sectional shape, 2 mm each side of the hexagonal) was immersed in the catalyst paste that was prepared in the same manner as in Example 1, so that the catalyst particles containing platinum and ruthenium were carried on the honeycomb structure. The amounts of platinum and ruthenium carried on the honeycomb structure were made 72 mg, respectively.

Next, a purifying apparatus was fabricated in the same manner as in Example 1, except for the use of this honeycomb structure instead of the porous sheet. Subsequently, a fuel cell system (system 2) was constructed in the same manner as in Example 1, except that the aqueous solution discharged from the anode of the fuel cell or its vapor was mixed with air in advance and the resultant mixture was introduced into the flow path of the purifying apparatus having only the inlet, and that no air was supplied to the flow path having the inlet and the outlet from the outside atmosphere.

COMPARATIVE EXAMPLE 3

A catalyst layer was formed by applying the catalyst paste by spraying onto a serpentine type flow path on a resin-impregnated graphite plate and drying it. The amounts of platinum and ruthenium in the catalyst layer were made 72 mg, respectively. Subsequently, the flow path side of the resin-impregnated graphite plate was covered with a flat face of another resin-impregnated graphite plate. The flow path was provided with an inlet and an outlet. A purifying apparatus was fabricated in the same manner as in Example 1, except that the combination of these resin-impregnated graphite plates was sandwiched between heaters and end plates.

Next, using this purifying apparatus, a fuel cell system (system 3) was constructed in the same manner as in Example 1, except that the aqueous solution discharged from the anode of the fuel cell or its vapor was mixed with air in advance and the resultant mixture was introduced into the flow path of the purifying apparatus.

The systems A to G of Examples 1 to 7 and the systems 1 to 3 of Comparative Examples 1 to 3 were evaluated for the catalytic combustion efficiency (purification rate) of the purifying apparatus and pressure loss in the following manner. Table 1 shows the results.

[Evaluation 1]

(i) Purification Rate

An aqueous methanol solution with a concentration of 2 mol/L was filled into the fuel tank of the fuel cell. The aqueous methanol solution was directly supplied to the anodes of the fuel cell from the fuel tank by means of the fuel pump such that the fuel flow rate per unit cell was 0.4 ml/min. Air was supplied to the cathodes of the fuel cell from the outside atmosphere by means of the air pump such that the air flow rate per unit cell was 1 L/min. The temperature of the fuel cell was set to 60° C. Thereafter, the fuel cell was operated so as to continuously produce electricity at a current density of 100 $mA/cm^2$. At this time, the amount of methanol contained in the aqueous solution discharged from the anodes of the fuel cell or its vapor was $1.56 \times 10^{-3}$ mol/min.

All the aqueous solution discharged from the anodes or its vapor was introduced into the predetermined inlet of the purifying apparatus and purified by oxidation. The flow rate of air introduced into the purifying apparatus was made 1 L/min. Purification rate was calculated by defining the amount of methanol contained in the purified aqueous solution discharged from the purifying apparatus or its vapor as a (mol/min) and substituting a into the following formula.

$$\text{Purification rate (\%)} = \{(1.56 \times 10^{-3} - \alpha)/1.56 \times 10^{-3}\} \times 100$$

(ii) Pressure Loss

In Examples 1 to 7, the value of pressure loss was measured when air was introduced into the purifying apparatus at a flow rate of 1 L/min. Also, in Comparative examples 1 to 3, the value of pressure loss was measured when the mixture of the effluent discharged from the anode of the fuel cell and air was introduced into the purifying apparatus at a flow rate of 1 L/min.

TABLE 1

| | Purifying apparatus | | | | Evaluation | |
|---|---|---|---|---|---|---|
| | Location of catalyst layer | How air is introduced | Air introduced | Temperature | Purification rate (%) | Pressure loss (kPa) |
| System A | Porous sheet | Separated from anode effluent | Ordinary air | 60° C. | 99.8 | 0.12 |
| System B | Porous sheet | Separated from anode effluent | Ordinary air | 60° C. | 97.1 | 0.12 |
| System C | Porous sheet | Separated from anode effluent | Ordinary air | 60° C. | 95.8 | 0.12 |
| System D | Porous sheet | Separated from anode effluent | Ordinary air | 40° C. | 96.2 | 0.12 |
| System E | Porous sheet | Separated from anode effluent | Ordinary air | 30° C. | 93.8 | 0.12 |
| System F | Porous sheet | Separated from anode effluent | Ordinary air | 20° C. | 91.1 | 0.12 |
| System G | Porous sheet | Separated from anode effluent | Air discharged from cathode | 60° C. | 99.6 | 0.12 |
| System 1 | Porous sheet | Premixed with anode effluent | Ordinary air | 60° C. | 95.4 | 5.38 |
| System 2 | Honeycomb structure | Premixed with anode effluent | Ordinary air | 60° C. | 76.4 | 0.24 |
| System 3 | Serpentine flow path | Premixed with anode effluent | Ordinary air | 60° C. | 68.6 | 0.15 |

In the systems A to G, since the flow path of the purifying apparatus into which the effluent discharged from the anode of the fuel cell is introduced has only the inlet, all the effluent discharged from the anode is passed through the porous sheet including the catalyst layer. Hence, all the methanol can be brought into contact with the catalyst, so that it is decomposed by catalytic combustion. Table 1 shows that the systems A to G have high purification rates.

When the system A is compared with the systems B and C, the system A, which uses the porous sheet composed of the catalyst layer sandwiched between the porous diffusion layers, has a particularly high purification rate. This is probably because the porous diffusion layers provided on both sides of the catalyst layer serve to make the supply of methanol discharged from the anode and oxygen in the air to the catalyst layer favorable and to make the discharge of the air containing carbon dioxide and water produced by the decomposition of methanol from the catalyst layer favorable.

When the systems A, D, E and F are compared, it can be seen that heightening the temperature inside the purifying apparatus results in an improvement in purification rate. This is because the catalytic activity is heightened, thereby leading to an increase in combustion efficiency of methanol.

When the system A is compared with the system G, it can be seen that the use of the air discharged from the cathode of the fuel cell as the air to be introduced into the purifying apparatus can also produce essentially the same effects as the use of air introduced from the outside atmosphere.

When the system A is compared with the system 1 of the comparative example, the system 1 has a lower purification rate. The reason is probably as follows. The effluent discharged from the anode is mixed with air in advance, and the resultant mixture is continuously supplied to the porous sheet including the catalyst layer. The continuous supply results in a reduction in the residence time necessary for methanol and oxygen to adsorb onto the active sites of the catalyst and react.

Further, when the system A is compared with the system 1 of the comparative example, the system 1 has a significantly larger pressure loss. This is probably because the air passes through the porous sheet together with the effluent discharged from the anode. On the other hand, in the case of the systems 2 and 3, their purification rates are significantly lower than those of the systems A to G, although their pressure losses are small. This is probably because the catalyst layer carried on the honeycomb structure or flow path is unable to fully trap the methanol in the aqueous solution. Specifically, it is highly probable that the methanol passes through the through-holes of the honeycomb structure or the flow path without reacting, thereby resulting in the significantly low purification rates.

EXAMPLE 8

A circulation-type fuel cell system according to the second embodiment of the present invention was constructed.

A purifying apparatus for purifying the effluent discharged from the anode of the fuel cell was fabricated in the same manner as in Example 1. However, the temperature inside the purifying apparatus was maintained at 30° C.

Using this purifying apparatus, a fuel cell system H as illustrated in FIG. 3 was constructed. A stack of 10 unit cells each comprising an anode, a cathode and a polymer electrolyte membrane was used as the fuel cell, in the same manner as in Example 1. An aqueous methanol solution was supplied to the anode of the fuel cell from the fuel tank via the fuel pump. Also, air was supplied to the cathode from the outside atmosphere via the air pump.

The effluent discharged from the anode of the fuel cell was passed through the cooler that was set to 25° C. and then introduced into the gas-liquid separating apparatus made of polytetrafluoroethylene, to separate the gas components from the liquid components.

Since most of the liquid components are unreacted methanol and water, they were collected into the fuel tank as appropriate. The methanol concentration of the aqueous methanol solution in the fuel tank was continuously monitored with the concentration sensor. When the methanol concentration lowered to below 1.8 mol/L, methanol was supplied to the fuel tank from the raw material tank until it became 2 mol/L again. Such concentration control was done by adjusting the valve installed in the conduit that coupled the raw material tank to the fuel tank. The opening and closing of the valve were controlled by an automatic control system linked to the concentration sensor.

Since the gas components, most of which were carbon dioxide and water vapor, included a small amount of methanol vapor, they were introduced into the flow path of the purifying apparatus having only the inlet. Air was supplied to the flow path of the purifying apparatus having the inlet and the outlet from the outside atmosphere via the pump.

EXAMPLE 9

A fuel cell system (system I) was constructed in the same manner as in Example 1, except that the atmospheric temperature was set to below 20° C. and that the temperature inside the purifying apparatus was maintained at 20° C. by means of the heaters.

COMPARATIVE EXAMPLE 4

A purifying apparatus was fabricated in the same manner as in Comparative Example 2, in which the honeycomb structure was used instead of the porous sheet. The aqueous solution discharged from the anode of the fuel cell or its vapor was mixed with air in advance and the resultant mixture was introduced into the flow path of the purifying apparatus having only the inlet. Air was not supplied to the flow path having the inlet and the outlet from the outside atmosphere. Except for these, in the same manner as in Example 1, a fuel cell system (system 4) was constructed.

COMPARATIVE EXAMPLE 5

A purifying apparatus was fabricated in the same manner as in Comparative Example 3, in which the catalyst layer was provided onto the serpentine type flow path on the resin-impregnated graphite plate. The aqueous solution discharged from the anode of the fuel cell or its vapor was mixed with air in advance and the resultant mixture was introduced into the flow path of the purifying apparatus. Except for these, in the same manner as in Example 1, a fuel cell system (system 5) was constructed.

The systems H and I of Examples 8 and 9 and the systems 4 and 5 of the Comparative Examples 4 and 5 were evaluated for the catalytic combustion efficiency (purification rate) of the purifying apparatus and pressure loss in the following manner. Table 2 shows the results.

[Evaluation 2]

(i) Purification Rate

An aqueous methanol solution with a concentration of 2 mol/L was filled into the fuel tank of the fuel cell. The aqueous methanol solution was directly supplied to the anodes of the fuel cell from the fuel tank by means of the fuel pump such that the fuel flow rate per unit cell was 2.0 ml/min. Air was supplied to the cathodes of the fuel cell from the outside atmosphere by means of the air pump such that the air flow rate per unit cell was 1 L/min.

The temperature of the fuel cell was set to 60° C. Thereafter, the fuel cell was operated so as to continuously generate electricity at a current density of 100 mA/cm$^2$. The aqueous solution discharged from the anode of the fuel cell or its vapor was cooled by passing it through the cooler that was set to 25° C., and its liquid components were collected by the gas-liquid separating apparatus. The amount of methanol contained in the separated gas components was $3.43 \times 10^{-5}$ mol/min.

All the separated gas components were introduced into the predetermined inlet of the purifying apparatus and purified by oxidation. The flow rate of air introduced into the purifying apparatus was made 1 L/min. Purification rate was calculated by defining the amount of methanol contained in the purified gas components discharged from the purifying apparatus as β (mol/min) and substituting α into the following formula.

$$\text{Purification rate (\%)} = \{(3.43 \times 10^{-5} - \beta)/3.43 \times 10^{-5}\} \times 100$$

(ii) Pressure Loss

In Examples 8 to 9, the value of pressure loss was measured when air was introduced into the purifying apparatus at a flow rate of 1 L/min. Also, in Comparative examples 4 to 5, the value of pressure loss was measured when the mixture of the effluent discharged from the anode of the fuel cell and air was introduced into the purifying apparatus at a flow rate of 1 L/min.

TABLE 2

| | Purifying apparatus | | | | Evaluation | |
| --- | --- | --- | --- | --- | --- | --- |
| | Location of catalyst layer | How air is introduced | Air introduced | Temperature | Purification rate (%) | Pressure loss (kPa) |
| System H | Porous sheet | Separated from anode effluent | Ordinary air | 30° C. | 99.9 | 0.12 |
| System I | Porous sheet | Separated from anode effluent | Ordinary air | 20° C. | 99.8 | 0.12 |
| System 4 | Honeycomb structure | Premixed with anode effluent | Ordinary air | 30° C. | 92.4 | 0.24 |
| System 5 | Serpentine flow path | Premixed with anode effluent | Ordinary air | 30° C. | 89.6 | 0.15 |

Table 2 clearly shows that the systems H and I also have purification rates that are equal to or higher than that of the system A. On the other hands, although the systems 4 and 5 have small pressure losses, their purification rates tend to lower. This is probably because the catalyst layer carried on the honeycomb structure or flow path is unable to fully trap methanol in the aqueous solution and, in addition, the activity of the catalyst is insufficient in the low temperature environment of approximately 30° C.

Although the foregoing examples have been described with reference to the systems including the direct-type fuel cell (DMFC) that uses methanol as the organic fuel, the present invention is not to be construed as being limited to them. It is also applicable to fuel cell systems that use other organic fuels than methanol, for example, dimethyl ether, ethylene glycol, etc.

INDUSTRIAL APPLICABILITY

The fuel cell system in accordance with the present invention is applicable to various systems that use a fuel cell as a power source without any particular limitation. However, it is particularly useful as a power source system for portable small-sized electronic devices, such as cellular phones, personal digital assistants (PDA), notebook PCs, and video cameras. Also, the fuel cell system of the present invention is useful as a power source system for electric scooters, electric vehicles, hybrid vehicles, etc.

The invention claimed is:

1. A fuel cell system comprising:
a fuel cell comprising an anode, a cathode, and an electrolyte interposed between said anode and said cathode; and
a purifying apparatus comprising a catalyst layer that purifies an effluent discharged from said anode,
wherein said purifying apparatus has a porous sheet including said catalyst layer and has a first flow path and a second flow path respectively disposed on one side and the other side of said porous sheet,
said first flow path has an inlet into which the effluent discharged from said anode is introduced,
said second flow path has an inlet into which air is introduced and an outlet, and
the effluent discharged from said anode is always passed through said porous sheet and discharged from said outlet, and the effluent is directed to said porous sheet without being mixed with the air in advance.

2. The fuel cell system in accordance with claim 1, wherein said fuel cell is a direct-type fuel cell in which an organic fuel is directly supplied to said anode and air is supplied to said cathode.

3. The fuel cell system in accordance with claim 2, wherein the effluent discharged from said anode is collected and purified without being supplied to the anode again.

4. The fuel cell system in accordance with claim 1, wherein said porous sheet has a layered structure further comprising porous diffusion layers that sandwich the catalyst layer.

5. The fuel cell system in accordance with claim 1, wherein the air introduced into said second flow path includes air discharged from said cathode.

6. The fuel cell system in accordance with claim 1, wherein a temperature inside said purifying apparatus becomes 30 to 80° C.

7. The fuel cell system in accordance with claim 1, wherein a catalyst in said catalyst layer consists of platinum or comprises an alloy or a mixture comprising platinum and other metal, and said other metal is at least one selected from the group consisting of ruthenium, iron, cobalt, nickel, chromium, molybdenum, rhodium, palladium, osmium, and iridium.

8. The fuel cell system in accordance with claim 2, wherein said organic fuel includes at least methanol.

9. The fuel cell system in accordance with claim 1, wherein a temperature inside said purifying apparatus becomes 20 to 60° C.

* * * * *